United States Patent [19]

Brown et al.

[11] 4,008,977
[45] Feb. 22, 1977

[54] COMPRESSOR BLEED SYSTEM

[75] Inventors: Wayne Myron Brown, Southwick, Mass.; Joseph Carmen Manente, Jr., Talcottville, Conn.

[73] Assignee: United Technologies Corporation, Hartford, Conn.

[22] Filed: Sept. 19, 1975

[21] Appl. No.: 614,807

[52] U.S. Cl. .................... 415/1; 415/88; 415/116; 416/95; 60/39.66
[51] Int. Cl.² ........................ F01D 25/12
[58] Field of Search ........... 415/88, 1, 115, 116; 416/95, 96, 97; 60/39.66, 39.07

[56] References Cited

UNITED STATES PATENTS

| | | | |
|---|---|---|---|
| 2,618,433 | 11/1952 | Loos et al. | 415/115 |
| 2,636,665 | 4/1953 | Lombard | 415/115 |
| 2,830,751 | 4/1958 | Quinn et al. | 60/39.65 |
| 2,858,101 | 10/1958 | Alford | 415/115 |
| 3,043,561 | 7/1962 | Scheper, Jr. | 415/115 |
| 3,099,134 | 7/1963 | Calder et al. | 60/39.65 |

FOREIGN PATENTS OR APPLICATIONS

| | | | |
|---|---|---|---|
| 1,098,959 | 2/1961 | Germany | 415/115 |
| 6,802,034 | 1/1968 | Netherlands | 415/115 |
| 243,325 | 1969 | U.S.S.R. | 415/115 |

*Primary Examiner*—C. J. Husar
*Attorney, Agent, or Firm*—Robert C. Walker

[57] ABSTRACT

Methods and apparatus for flowing cooling air from the compressor section to the turbine section of a gas turbine engine are disclosed. Cooling air from the compressor is flowed radially inward through the compressor drum cavity and thence axially rearward along the rotor shaft to the turbine. Vortex pressure losses in the drum cavity are diminished to enable effective utilization of a lower pressure, lower temperature cooling air source. The use of air from the lower pressure, lower temperature source improves the overall engine operating efficiency while maintaining turbine cooling rates which are consonant with durable operation of the engine.

6 Claims, 8 Drawing Figures

COMPRESSOR BLEED SYSTEM

BACKGROUND OF THE INVENTION

1. Field of the Invention

This invention relates to gas turbine engines, and more particularly to engines having a coolable turbine section.

2. Description of the Prior Art

In a gas turbine engine of the type referred to above, pressurized air and fuel are burned in a combustion chamber to add thermal energy to the medium gases flowing therethrough. The effluent from the chamber comprises high temperature gases which are flowed downstream in an annular flow path to the turbine section of the engine. A limiting factor in many engine designs is the maximum temperature of the medium gases which can be tolerated in the turbine without adversely effecting the durability of the turbine components. The maximum allowable temperature of the medium gases is increased in most modern engines by cooling various regions of the turbine. In one engine form, cooling air from the compressor is flowable in a radially inward direction through the compressor drum cavity and axially rearward along the rotor shaft. The cooling air is discharged to the drum cavity through radially oriented bleed holes at the inner wall of the flow path for the medium gases in the compressor at a tangential velocity which approximates the local drum speed.

Various combinations of cooling air temperature and cooling air flow rate are employable to effect the desired cooling characteristics in the turbine. The pressure of the cooling air utilized, however, must be sufficient to overcome the frictional flow losses and the vortex pressure losses inherently generated as the air is flowed to the turbine. Accordingly, the source of the cooling air is selected at an axial location in the compressor which will satisfy the combined temperature, flow rate and pressure requirements.

In engine constructions having high speed rotors, the vortex pressure losses alone comprise the principal restriction to the flow of cooling air. As is expressed below, the vortex pressure loss increases in proportion to the square of the tangential velocity of the cooling air in the drum cavity.

$$\Delta P = \int \rho \frac{V_T^2}{r} dr$$

where
$\Delta P$ = vortex pressure loss
$\rho$ = density of the air
$V_T$ = tangential velocity of the air
$r$ = radius The tangential velocity and hence, the vortex pressure loss is dependent upon the type of flow within the compressor drum. Free vortexing type flow is discussed in U.S. Pat. No. 2,830,751 to Quinn et al wherein, in accordance with the law of conservation of angular momentum, the tangential velocity of the air within the drum is inversely proportional to the radius.

$$V_T r = K$$

where
$K$ = constant

In Quinn et al compressor air is flowable from the medium flow path in the radially inward direction at low engine speeds to prevent compressor surging. As the engine speed increases, the tangential velocity of the air within the drum increases to the point where the vortex pressure loss imposes a significant flow restriction on the air within the drum cavity. Upon attainment of a sufficient engine speed, the radial inflow of air is completely stopped.

While the free vortexing phenomenun has been advantageously employed in the Quinn et al anti-surging construction, the same phenomenun has a potentially disasterous effect on turbine systems which rely on internally bled air for cooling. In such a system a high level of air flow is required at high engine speeds to compensate for increased temperatures of the working medium gases in the turbine flow path. To insure adequate cooling air flow, the source of cooling air is positioned axially rearward in the compressor at a location imposing a sufficient pressure differential between the source and the cooled region of the turbine to overcome the vortex pressure loss at high engine speeds. Any rearward adjustment of the cooling air source is undesirable in that not only is the temperature of the cooling air raised to the detriment of cooling effectiveness, but also the overall engine efficiency is decreased by increasing the amount of compressor work required to raise the pressure of the cooling air to an adequate level.

Prior attempts have been made to reduce vortex pressure losses in cooling flow within the compressor drum. In two typical constructions U.S. Pat. No. 2,618,433 to Loos et al entitled "Means for Bleeding Air from Compressors" and 2,910,268 to Davies et al entitled "Axial Flow Fluid Machines," cooling air is flowed radially inward through passageways in the compressor drum. The passages conform the tangential velocity of the air flowing therethrough to the local tangential velocity of the rotor making the tangential velocity directly proportional to the radius.

$$V_T/r = K$$

Referring to the vortex pressure loss formula above, it is evident that the Loos et al and Davies et al constructions offer substantially reduced resistance to flow when compared to the open drum cavity as shown in Quinn et al. The latter two constructions, however, do add substantially to the structural complexity of the rotor system without completely eliminating the vortex pressure loss.

Improved apparatus is required to increase engine performance by reducing vortex pressure losses without adding substantially to the cost, weight or structural complexity of the engine.

SUMMARY OF THE INVENTION

A primary object of the present invention is to improve the durability of a gas turbine engine by cooling the components of the turbine section with minimal adverse effect on the operating efficiency or structural complexity of the engine. In furtherance of the stated primary objective, it is desired to flow to the turbine the coolest air which is available in quantities sufficient to effect the required rate of cooling. Accordingly, one specific object is to minimize the pressure loss imposed upon the cooling air flow by vortexing within the compressor drum cavity as the air is flowed radially inward through the cavity and axially rearward along the rotor to the turbine.

According to the present invention, turbine cooling air is flowable in a radially inward direction from the flow path for the working medium gases in the compressor section of the engine through means which are operatively disposed in the compressor drum so as to cause the air flowing therethrough to be discharged at a tangential velocity with respect to the drum which is opposite to the direction of drum rotation.

A primary feature of the present invention is the cooling air bleed means in the compressor drum which is operatively disposed so as to cause the air to flow into the drum cavity in a relative direction which is opposite to the direction of drum rotation. In one embodiment the bleed means comprises a plurality of orifices which are obliquely oriented to a line tangent to the drum at the location of each orifice. In an alternate embodiment a nozzle extends from each orifice to discharge the air flow therethrough in a direction which is essentially parallel to the tangent line. In yet another embodiment the oblique orifices are in substantial alignment with the relative direction of flow of the working medium gases in the local region of the compressor flow path.

A principal advantage of the present invention is a reduction in the vortex pressure loss which is imposed upon the turbine cooling air as the air is flowed radially inward through the compressor drum cavity. Overall engine performance and cooling effectiveness are improved through the utilization of a lower temperature, lower pressure, cooling air source which is enabled by lower vortex pressure losses. The available pressure of the cooling air is increased to include a partial velocity pressure head in the embodiment having oblique surfaces aligned with the direction of flow of the working medium gases in the compressor.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
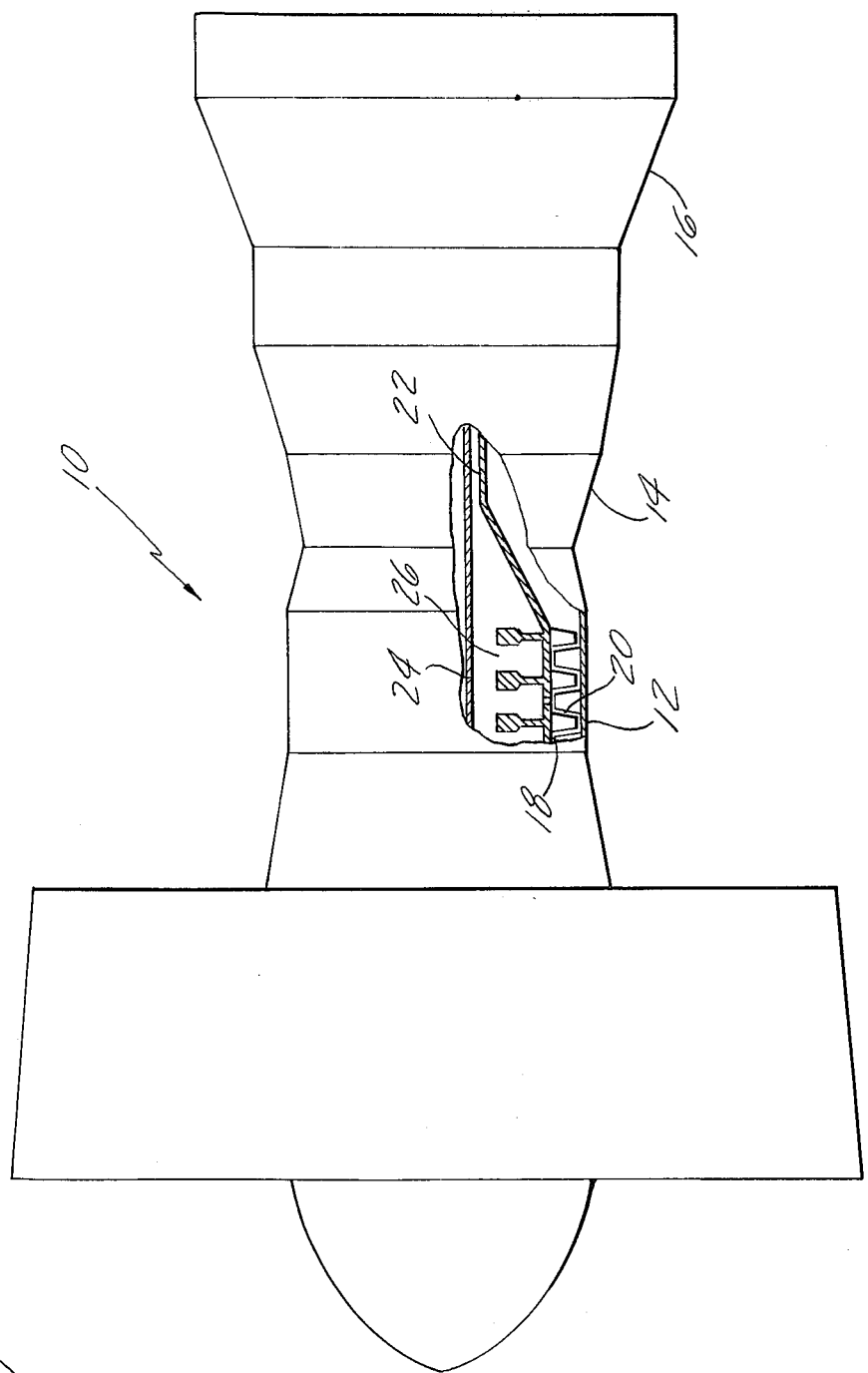
FIG. 1 is a simplified side elevation view of a gas turbine engine with a portion of the compressor section broken away to reveal the compressor drum and drum cavity.

The gas turbine engine 10 shown in the FIG. 1 simplified representation has a compression section 12, a combustion section 14 and a turbine section 16. A portion of the compression section is broken away to reveal a drum 18 which forms the inward boundary of a flow path 20 for the working medium gases in the compressor. The drum, which is cylindrical, is joined to a high speed rotor shaft 22 which extends axially rearward into the turbine section 16. A low speed rotor shaft 24 is disposed radially within the drum 18 and the high speed rotor shaft 22 forming a drum cavity 26 therebetween. Turbine cooling air is commonly flowable from the compressor flow path 20, radially inward through the drum cavity 26 and axially rearward between the rotor shafts to the turbine.

Figure 2:
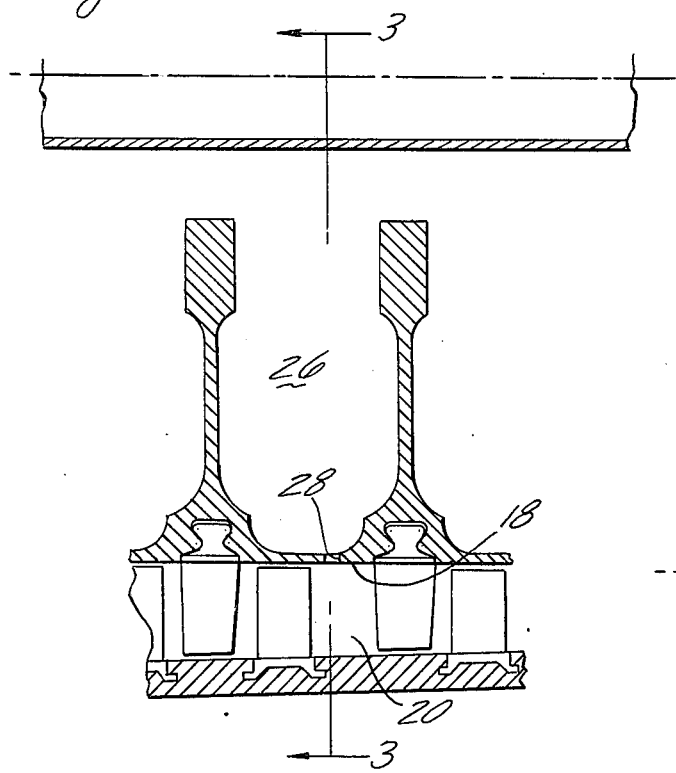
FIG. 2 is a simplified cross section view of a portion of the compressor section showing the compressor and drum cavity.
Figure 3:
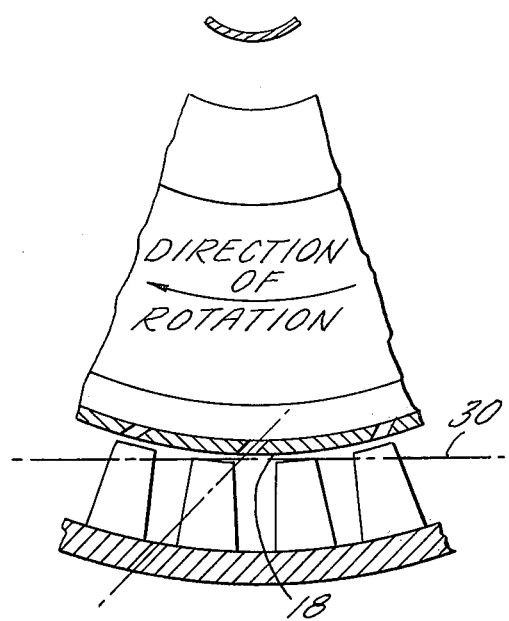
FIg. 3 is a sectional view taken along the line 3—3 as shown in FIG. 2.

Air is flowable from the flow path 20 into the drum cavity 26 in one embodiment through a plurality of orifices 28 which are shown in FIG. 2. The orifices are obliquely oriented to a tangent line 30 drawn to the drum 18 at each orifice. The orifices are further oriented so as to cause the air flowing therethrough during operation of the engine to be discharged with a tangential velocity relative to the drum 18 which is opposite in direction to the direction of drum rotation.

Figure 4:
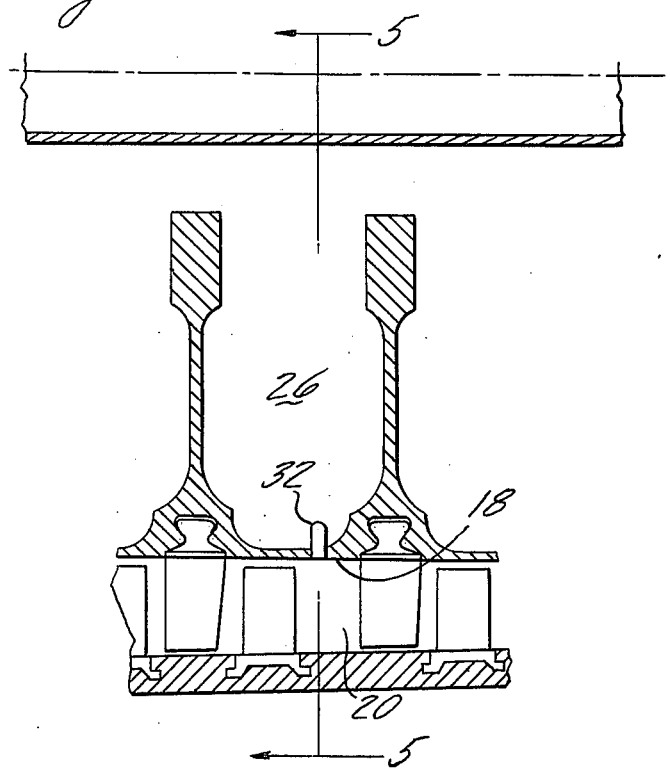
FIG. 4 is a simplified cross section view showing a first alternate compressor drum construction.
Figure 5:
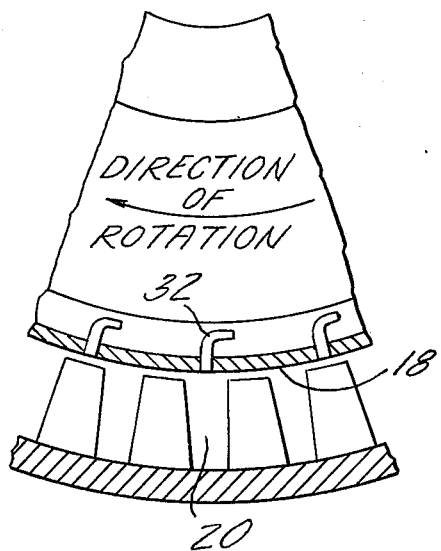
FIg. 5 is a sectional view taken along the line 5—5 as shown in FIG. 4.

In an alternate embodiment which is shown in FIGs. 4 and 5, air is flowable from the flow path 20 into the drum cavity 26 through a plurality of nozzles 32. The nozzles 32 contain a 90° bend in a direction opposite to the direction of rotation of the drum so as to discharge the air flowing therethrough tangentially with respect to the rotating drum.

Figure 6:
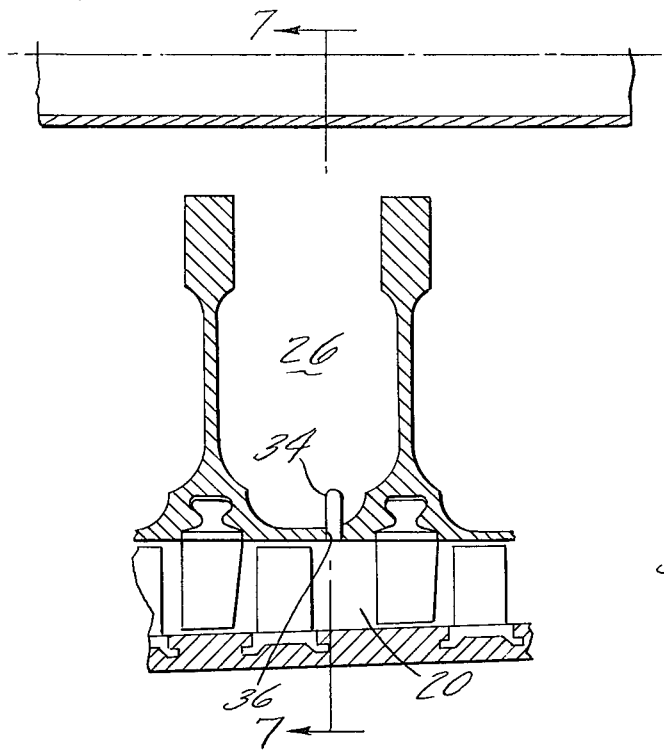
FIg. 6 is a simplified cross section view showing a second alternate compressor drum construction.
Figure 7:
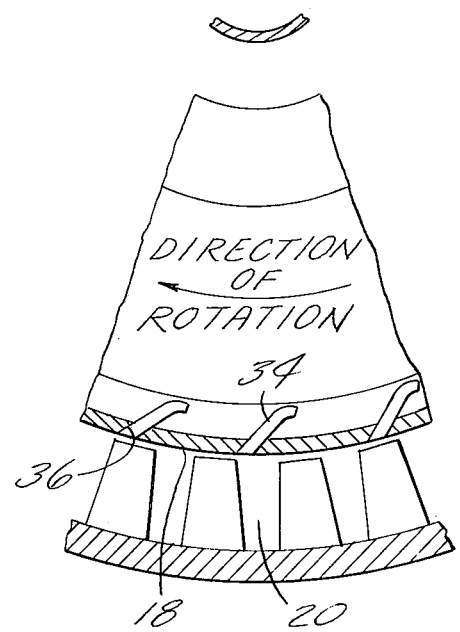
FIG. 7 is a sectional view taken along the line 7—7 as shown in FIG. 6.
Figure 8:
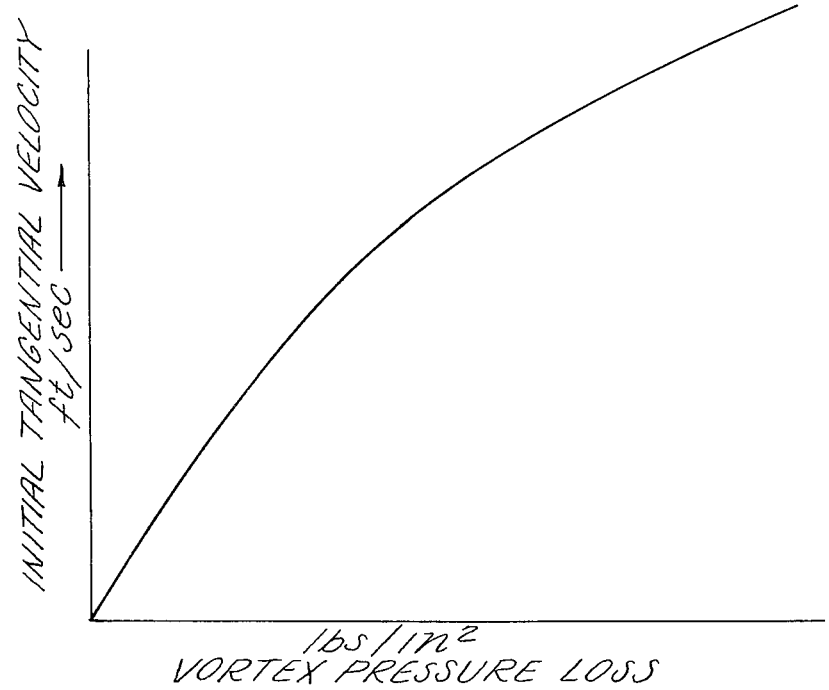
FIG. 8 is a graph illustrating the general relationship between the tangential velocity of the cooling air entering the drum cavity and the vortex pressure loss.

In a further distinctive embodiment which is shown in FIGS. 6 and 7, air is flowable from the flow path 20 into the drum cavity through a plurality of nozzles 34. Each nozzle 34 extends inwardly from a drum hole 36 which is canted with respect to the engine centerline so as to be in substantial alignment with the direction of flow of the medium gases in the flow path 20 relative to the rotating drum.

During operation of the engine, the temperature of the working medium gases in the turbine section is excessive and cooling of the adversely affected components is required. A portion of the cooling requirement is filled by compressor air which is bled through the compressor drum and flowed axially rearward to the turbine section. The source of the cooling air is axially located in the compressor at a pressure which is sufficient to overcome the vortex pressure loss imposed upon the air as it flows radially inward.

As is discussed in the prior art section of this specification, the vortex pressure loss is proportional to the square of the tangential velocity. Cooling air, which is flowed into the drum cavity 26 through the orifices and nozzles as described herein, enters the cavity at a reduced tangential velocity when compared to prior known structures having radially oriented holes or inwardly extending guide tubes. The reduced initial tangential velocity substantially reduces the vortex pressure loss as is displayed for one typical engine in the FIG. 5 graph.

In the FIG. 6 embodiment the orifices 36 in the drum 18 are substantially aligned with the direction of flow of the medium gases in the compressor flow path 20. Accordingly the ram effect of the compressor air, which has a tendency to swirl about the engine centerline, is captured within the orifices to increase the pressure of the source air available.

The reduced vortex pressure loss enables axially forward adjustment of the cooling air source in the compressor to a region of lower pressure. The use of lower pressure air for cooling enhances the overall engine operating efficiency by reducing the amount of compressor work required to raise the pressure of the cooling air to adequate levels. Concurrently, the temperature of the cooling air is lessened by the forward adjustment of the source and increased cooling effectiveness results. The increased cooling effectiveness further improves overall efficiency by reducing the amount of air required in the turbine for cooling.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A method for flowing cooling air from the compressor section of a gas turbine engine to the turbine section wherein said engine has a compressor drum and a drum cavity which are located radially inward of the flow path for the working medium gases and a rotor shaft which connects the compressor drum to the turbine, comprising the steps of:

bleeding air from the flow path for the working medium gases in the compressor section;

discharging the bleed air into the drum cavity in a tangential direction relative to the drum which is opposite to the direction of drum rotation; and flowing the discharged air radially inward through the drum cavity and axially rearward to the turbine section of the engine.

2. The invention according to claim 1 wherein the air is discharged into the compressor drum at an absolute tangential velocity which approaches zero to minimize the vortex pressure loss on the air flowing through the drum cavity.

3. In a gas turbine engine of the type having a turbine section and a compression section wherein the compression section has incorporated therein radially inward of the flow path for the working medium gases a cylindrical drum and a drum cavity through which cooling air is flowable from the flow path in the compressor to the turbine for cooling components of the turbine, the improvements comprising:

means including a nozzle extending radially inward from said cylindrical drum for discharging compressor air from the medium flow path into the drum cavity at a tangential velocity with respect to the drum which is opposite in direction to the direction of rotation of the drum.

4. The invention according to claim 1 wherein the air is discharged into the compressor drum cavity at an absolute tangential velocity which approaches zero to minimize the vortex pressure loss imposed upon the air flowing through the drum cavity.

5. The invention according to claim 3 wherein said nozzle is adapted to cause the air flowing therethrough to discharge in a direction which is substantially parallel to the tangent line.

6. The invention according to claim 5 wherein the air is discharged into the compressor drum at an absolute tangential velocity which approaches zero to minimize the vortex pressure loss on the air flowing through the drum cavity.

* * * * *